United States Patent
Broderick et al.

(10) Patent No.: US 9,476,989 B2
(45) Date of Patent: Oct. 25, 2016

(54) VECTOR TRACKING LOOP OPERABILITY THROUGH OSCILLATOR MICRO-JUMP EVENT

(71) Applicant: Honeywell International Inc., Morristown, NJ (US)

(72) Inventors: James B. Broderick, Maple Grove, MN (US); Lawrence Charles Vallot, Lake Elmo, MN (US)

(73) Assignee: Honeywell International Inc., Morris Plains, NJ (US)

(*) Notice: Subject to any disclaimer, the term of this patent is extended or adjusted under 35 U.S.C. 154(b) by 378 days.

(21) Appl. No.: 14/254,285

(22) Filed: Apr. 16, 2014

(65) Prior Publication Data

US 2015/0301188 A1 Oct. 22, 2015

(51) Int. Cl.
- *G01S 19/23* (2010.01)
- *G01S 19/47* (2010.01)
- *G01S 19/00* (2010.01)

(52) U.S. Cl.
CPC ............... *G01S 19/47* (2013.01); *G01S 19/23* (2013.01)

(58) Field of Classification Search
CPC ........ G01S 19/38; G01S 19/39; G01S 19/42; G01S 19/45; G01S 19/47; G01S 19/01; G01S 19/02; G01S 19/13; G01S 19/23; G01S 19/235; G01S 19/24; G01S 19/25; G01S 19/256; G01S 19/29; H03L 1/02; H03L 1/022; H03L 1/023; H03L 1/025; H03L 1/026; H03L 7/06; H03L 7/08; H03L 7/14; H03L 7/146

See application file for complete search history.

(56) References Cited

U.S. PATENT DOCUMENTS

| | | | | |
|---|---|---|---|---|
| 4,746,879 A | * | 5/1988 | Ma | H03L 1/025 331/116 FE |
| 4,921,467 A | * | 5/1990 | Lax | H03L 1/025 331/176 |
| 5,081,431 A | * | 1/1992 | Kubo | H03L 1/026 331/116 R |
| 5,162,758 A | * | 11/1992 | Onishi | H03L 1/026 331/158 |
| 5,781,073 A | * | 7/1998 | Mii | H03L 1/026 331/176 |
| 5,940,027 A | * | 8/1999 | Forseth | G01S 19/235 331/176 |

(Continued)

OTHER PUBLICATIONS

"IGS-20x series, deeply integrated guidance family for missiles, munitions and projectiles", Integrated Guidance Systems LLC, 2012, pp. 1-2.

(Continued)

*Primary Examiner* — Bernarr Gregory
(74) *Attorney, Agent, or Firm* — Fogg & Powers LLC

(57) ABSTRACT

A navigation system comprises a GNSS receiver that receives GNSS signals on multiple tracking channels, an INS that generates inertial data, and a processor. A micro jump detection and correction module comprises an oscillator micro jump detector that monitors estimates of $C/N_0$ in all tracking channels, and detects a micro-jump event when there is an abrupt decrease of $C/N_0$ in all tracking channels. An offsets module defines a plurality of carrier NCO command offsets to search over signal Dopplers in all available tracking channels after the micro jump event is detected, and sends the carrier NCO command offsets to the GNSS receiver to be added to nominal carrier NCO commands. The micro jump detector selects a tracking channel with the highest $C/N_0$ after carrier NCO command offsets are added to nominal carrier NCO commands, computes corrections for clock error estimates, and sends the corrections for the clock error estimates to a GNSS/inertial Kalman filter.

20 Claims, 4 Drawing Sheets

(56) References Cited

U.S. PATENT DOCUMENTS

| | | | | |
|---|---|---|---|---|
| 6,067,503 | A * | 5/2000 | Yakos | G01S 19/235 701/408 |
| 6,167,347 | A | 12/2000 | Lin | |
| 6,194,970 | B1 * | 2/2001 | Nielsen | H03L 7/146 331/16 |
| 6,661,371 | B2 * | 12/2003 | King | G01S 19/256 342/357.62 |
| 6,903,684 | B1 * | 6/2005 | Simic | G01S 19/235 342/357.29 |
| 7,061,425 | B2 * | 6/2006 | Geier | G01S 19/29 342/357.68 |
| 7,388,539 | B2 | 6/2008 | Whitehead et al. | |
| 7,459,984 | B2 * | 12/2008 | Wang | G01S 19/235 331/158 |
| 7,579,984 | B2 | 8/2009 | Wang et al. | |
| 8,248,300 | B2 | 8/2012 | Buck et al. | |
| 8,373,515 | B2 * | 2/2013 | Anandakumar | G01S 19/235 331/158 |
| 8,392,743 | B2 * | 3/2013 | Felbach | G01S 19/02 331/44 |
| 8,693,969 | B2 * | 4/2014 | Bickerstaff | G01S 19/235 455/192.1 |
| 2011/0298661 | A1 | 12/2011 | Buck et al. | |

OTHER PUBLICATIONS

Vittorini, Larry D., "Micro-Jump Screening Station for GPS User Equipment", IEEE International Frequency Control Symposium, 1997, pp. 373-381, Publisher: IEEE.

* cited by examiner

VECTOR TRACKING LOOP OPERABILITY THROUGH OSCILLATOR MICRO-JUMP EVENT

BACKGROUND

A well known deficiency of global navigation satellite systems (GNSS), such the Global Positioning System (GPS), is that oscillator quartz crystals in these systems exhibit isolated temperature induced frequency jumps, typically on the order of 1-100 parts per billion (ppb). These so called "micro-jumps" have been found to be disruptive to the carrier and sometimes the code tracking loops used in precision GNSS equipment, and may, if severe, cause temporary loss of satellite tracking. Typically, temperature compensated quartz oscillators are prescreened over temperature for frequency jumps and rejected if jumps larger than some maximum limit is measured (e.g., 10 m/sec (33 ppb)). Here, the oscillator frequency jump is categorized in either fractional frequency units (33 ppb) or in equivalent velocity units, that is, the fractional frequency error times the speed of light (33 ppb$\times 3 \times 10^8$ m/sec=10 m/sec).

In unaided or in tightly-coupled modes of operation, a GNSS receiver is more robust in detecting and recovering from oscillator micro jumps where the GNSS receiver is controlling the code and carrier tracking loops, than compared to an integrated Inertial Navigation System (INS)/GNSS operating in an ultra-tightly-coupled (UTC) mode of operation. In an INS/GNSS, the INS mission processor receives in phase (I) and quadrature phase (Q) data from the GNSS receiver, and controls the code and carrier tracking loops through code and carrier numerically controlled oscillator (NCO) commands. The advantages of operating in UTC mode are enhanced anti jam performance, and the ability to maintain better tracking performance during high dynamic operation. However, due to the much narrower tracking bandwidth, the UTC mode is more susceptible to quartz crystal micro-jumps.

SUMMARY

A navigation system comprises a global navigation satellite system (GNSS) receiver configured to receive multiple GNSS signals on a plurality of signal tracking channels, an inertial navigation system (INS) configured to generate inertial data, and a processor in operative communication with the GNSS receiver and the INS. A micro jump detection and correction module is in operative communication with the processor and comprises an oscillator micro jump detector configured to monitor estimates of carrier to noise density ($C/N_0$) ratios in all of the signal tracking channels, and detect onset of a micro jump event when there is an abrupt decrease in the $C/N_0$ ratios in all of the signal tracking channels. A carrier numerically controlled oscillator (NCO) command offsets module is in operative communication with the micro jump detector and is configured to define a plurality of carrier NCO command offsets to search over signal Dopplers in all available signal tracking channels after the micro-jump event is detected, and send the carrier NCO command offsets to the GNSS receiver to be added to nominal carrier NCO commands. The micro jump detector is further configured to select a signal tracking channel with the highest $C/N_0$ ratio after the carrier NCO command offsets are added to the nominal carrier NCO commands, compute corrections for clock error estimates, and send the corrections for the clock error estimates to a GNSS/inertial Kalman filter.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

Figure 1:
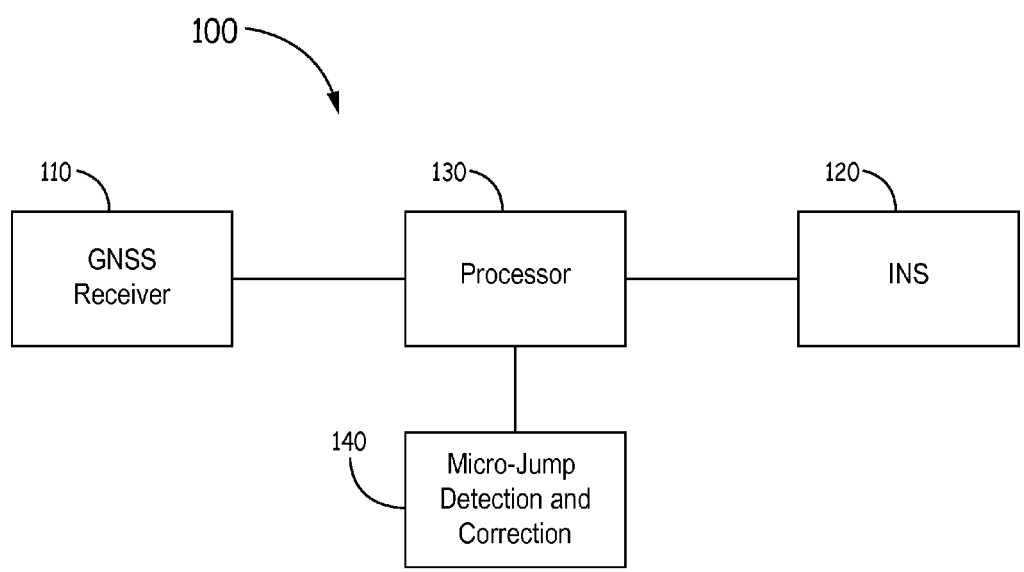
FIG. 1 is a block diagram of a navigation system according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A system and method for providing vector tracking loop operability through an oscillator micro jump event is disclosed. In general, the method searches for a lost carrier signal when a micro jump event occurs. This approach uses satellite signal tracking channels to search for a carrier shift during the micro jump event, and then corrects all the other channels for the detected frequency shift.

In the present method, the search space is spread out for carrier frequency tracking in a next iteration following an immediate decrease in the carrier to noise density ($C/N_0$) ratio for all satellites being tracked. This method assumes a micro-jump event was the likely cause of the sudden drop of the $C/N_0$ ratio across all channels, and tries to anticipate the magnitude of the micro-jump by adjusting the carrier numerically controlled oscillator (NCO) commands in the next iteration in an attempt to maintain carrier frequency tracking.

The present technique can be implemented in an integrated navigation system that includes a Global Navigation Satellite System (GNSS) receiver, such as a Global Positioning System (GPS) receiver, and an Inertial Navigation System (INS). This navigation system is typically operated in an ultra-tightly-coupled (UTC) signal tracing loop configuration. The present method provides for robust micro jump detection and recovery without the need to release the tracking channel from external UTC control. The present approach is able to account for larger frequency offsets caused by micro jump events while the UTC navigation and tracking function is controlling both the carrier and code tracking loops.

As used herein, the term "micro-jump" refers to a disjoint or step change in frequency of a clock or oscillator in the GNSS receiver. Some causes of micro-jumps include reference oscillator temperature induced mechanical stresses, or contaminants in an oscillator cavity. A sufficiently large micro jump can cause satellite signal tracking loops to be driven out of lock and result in a loss of track of the GNSS signal. For example, an abrupt step change to the GNSS oscillator frequency can cause tracking channels lose lock of the satellite signal. In some cases, a micro jump of as little as 20 parts per billion (ppb) can be sufficient to cause a loss of tracking.

In the event of an oscillator micro jump resulting in an abrupt change in frequency, the $C/N_0$ will suddenly drop for all UTC tracking channels. If the step change in frequency exceeds a predetermined threshold, such as 50 Hz in most applications using GNSS receivers, the tracking loop's replica of the satellite signal will no longer correlate with the incoming satellite signal, and $C/N_0$ ratio values will rapidly decrease. A micro jump detection algorithm is employed to denote the sudden decrease in carrier correlation for all channels being tracked and the rapid decay in $C/N_0$ ratio for each channel. The primary cause for such an event is very likely to be a GNSS oscillator micro-jump. A pulsed jammer may also cause a sudden decrease in $C/N_0$ ratio, however, this can be excluded based on the point in the trajectory when the event occurs (e.g., near target versus much further away), and looking at both GPS L1 and L2 links performance parameters to rule out a pulse jamming event on one of the links.

Once a probable micro jump event is detected, a search algorithm is immediately initiated to increment or decrement each channel's NCO command in an attempt to reacquire carrier correlation. The present method reacquires carrier tracking prior to the loss of code tracking, and then compensates code tracking loops for error incurred after the micro jump and during the carrier search period to re-establish optimal code and carrier autocorrelation.

Further details of the present system and method are described hereafter with reference to the drawings.

FIG. 1 illustrates a navigation system 100 according to one embodiment. The navigation system 100 generally includes a Global Navigation Satellite System (GNSS) receiver 110, an Inertial Navigation System (INS) 120, a processor unit 130, and a micro jump detection and correction module 140.

In one embodiment, navigation system 100 is a UTC or deeply integrated navigation system. In such a navigation system, the signal tracking loops of the GNSS receiver are controlled by the processor rather than by the GNSS receiver. For example, the processor tracks the GNSS satellite signals collectively rather than as single independent channels. The GNSS receiver 110 is configured to receive radio frequency (RF) signals from each of a plurality of GNSS satellites. Examples of such satellites include the United States GPS satellite constellation, the Galileo satellite constellation (Europe), and the Compass/Beidou satellite constellation (China).

Each satellite transmits an RF signal at one or more predetermined carrier frequencies. Each RF signal is modulated with a code sequence that is orthogonal to the code sequence of the RF signal from each of the other satellites. The RF signal received from each satellite and processed in navigation system 100 is associated with a respective signal tracking channel. The GNSS receiver 110 down-converts the received RF signals for each channel to an intermediate frequency via mixing stages with a local oscillator and digitizes the downconverted RF signal.

The INS 120 can include an Inertial Measurement Unit (IMU), which generates inertial data for use in computing an inertial navigation solution.

Each of GNSS receiver 110 and INS 120 provides navigation measurements to processor unit 130, which blends the measurements from each of GNSS receiver 110 and INS 120 to improve resistance to noise and jamming as well as improve the navigation solution accuracy. For example, if a lock on GNSS satellite signals is lost, navigation system 100 uses the data from INS 120 until the GNSS signals are reacquired. Additionally, the processor unit 130 provides code and carrier numerically controlled oscillator (NCO) commands to the GNSS receiver 110, driving the replica signals used for tracking the satellite signals.

The micro jump detection and correction module 140 provides functions that help a satellite signal tracking loop recover from the disruptive effect of a large sudden frequency shift in the GNSS receiver oscillator used to generate code and carrier replica signals. These large sudden frequency shifts or "micro-jumps" occur with many types of oscillators used in GNSS receivers. When a large micro jump occurs, one of the most immediate impacts is that apparent signal to noise ratios (equivalently, the carrier power to noise density ratio "$C/N_0$") on all tracking channels can immediately plunge from normal healthy tracking values to very low values indicative of no correlation between the incoming GNSS satellite signal and the receiver's locally generated replica signal. The local replica signal will have abruptly shifted in frequency due to the micro-jump.

Figure 2:
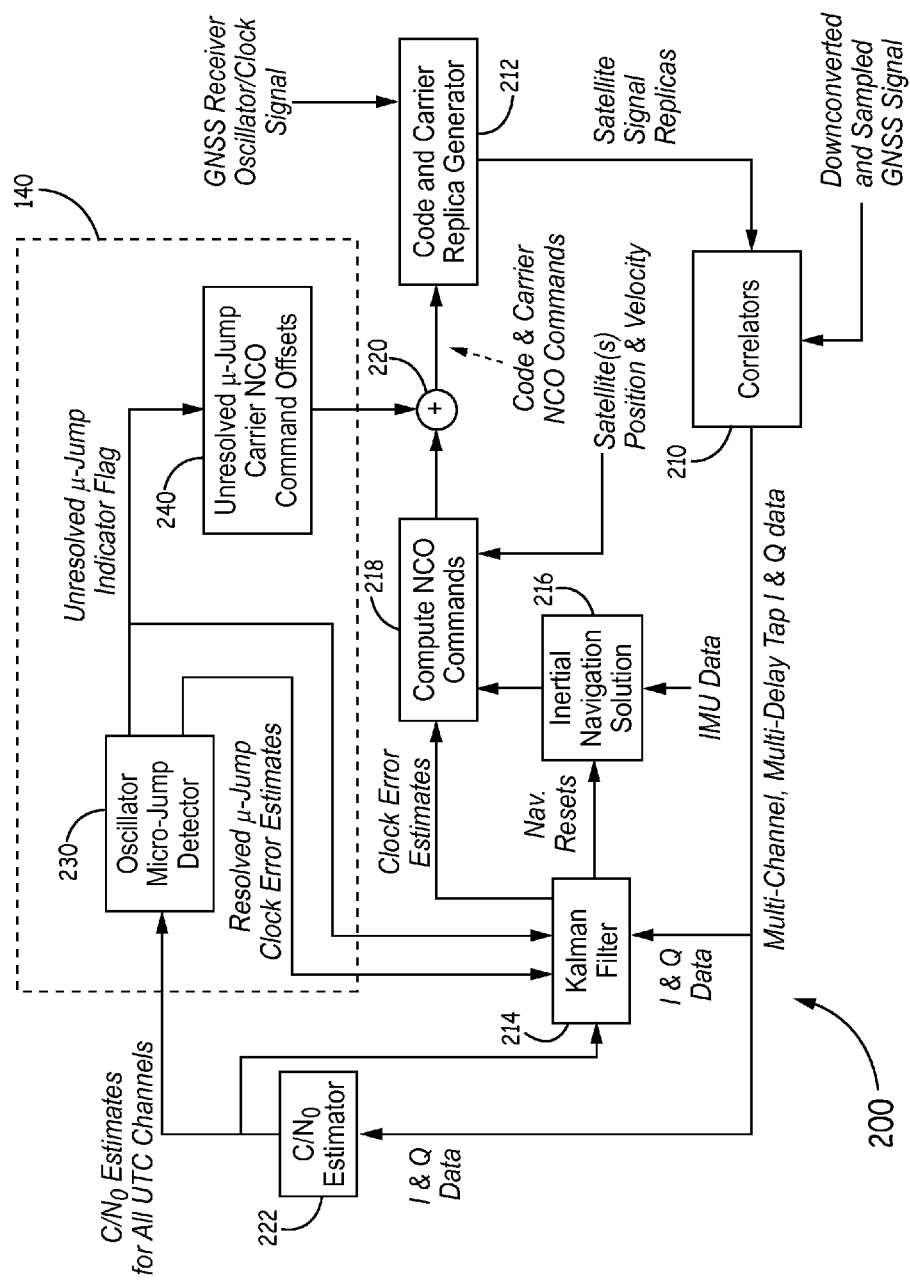
FIG. 2 is a block diagram of an ultra-tightly coupled navigation and signal tracking loop according to one embodiment, which includes micro jump detection and correction functions that can be implemented in the navigation system of FIG. 1.

FIG. 2 illustrates a navigation and signal tracking loop 200 according to one embodiment, which further shows the micro jump detection and correction functions provided by module 140 of navigation system 100. In tracking loop 200, a downconverted and sampled GNSS signal is sent to a correlators module 210, which can be part of GNSS receiver 110. A code and carrier replica generator 212, which can also be part of GNSS receiver 110, sends satellite signal replicas to correlators module 210.

The replica generator 212 uses an oscillator/clock signal in the GNSS receiver to generate a replica of the downconverted signal for each channel. In particular, the replica generator 212 attempts to generate a replica signal that matches the code sequence and downconverted carrier frequency for each channel. The correlators module 210 compares each generated replica signal with the respective downconverted signal. Based on the comparison, the correlators module 210 outputs in phase (I) and quadrature phase (Q) data for each signal tracking channel at multiple code delay taps.

The I and Q data is used to infer code and carrier tracking errors and is sent to a Kalman filter 214, such as a GNSS/inertial Kalman filter, for further processing. The Kalman filter 214 calculates corrections to estimated states such as position, velocity, and acceleration, which are output as navigation reset values to aid the INS 120 (FIG. 1) in correcting an inertial navigation solution 216 generated from IMU data. The INS 120 uses the reset values from Kalman filter 214 to update estimated navigation states. The Kalman filter 214 also computes and outputs GNSS receiver clock frequency and phase error estimates, where the clock frequency error represents the frequency error of the GNSS receiver's master oscillator, and the clock phase error represents a time offset associated with the GNSS receiver's maintenance of accurate time.

The inertial navigation solution (including position, velocity, acceleration, and angular rate measurements) is provided as a feedback signal to an NCO command generator 218, which also receives the clock error estimates from Kalman filter 214 as well as satellite(s) position and velocity data. The NCO command generator 218 computes code and carrier NCO commands for each channel, which is output to a summer 220. The code and carrier NCO commands output from summer 220 are sent to replica generator 212 for use in code and carrier signal replication.

The correlators module 210, replica generator 212, Kalman filter 214, inertial navigation solution 216, and NCO command generator 218, together represent a typical UTC tracking loop approach to integration of inertial and GNSS measurement data.

As depicted in FIG. 2, the I and Q data from correlators module 210 is also sent to a $C/N_0$ estimator module 222, which calculates the carrier power to noise density ratio for each channel. The $C/N_0$ estimates for all UTC channels are output from estimator module 222 to micro jump detection and correction module 140 for further processing. The estimator module 222 also outputs the $C/N_0$ estimates for all UTC channels to Kalman filter 214.

The detection and correction module 140 includes an oscillator micro-jump detector 230, which is in operative communication with an unresolved micro jump carrier NCO command offsets module 240. The micro jump detector 230 receives the $C/N_0$ estimates for all channels from estimator module 222. The micro jump detector 230 includes a detection algorithm that performs the function of monitoring $C/N_0$ behavior, to detect the onset of an apparent micro jump event.

When a micro jump event is detected, an unresolved micro jump indicator flag is sent to NCO command offsets module 240 and to Kalman filter 214. A search algorithm in NCO command offsets module 240 then initiates a search process to determine the shifts in the replica signal carrier frequencies due to the micro-jump. The available UTC tracking channels are each assigned a different frequency NCO command offset, to look for the presence of signal correlation on that particular tracking channel. The NCO command offsets are output from module 240 and sent to summer 220 to be added to the nominal UTC tracking loop NCO commands.

Once evidence of signal correlation appears on one of the tracking channels being used in the search process, in the form of a higher $C/N_0$ ratio value typical of normal signal tracking, it is an indication of the frequency shift that was taken on by the oscillator at the micro-jump. That knowledge, in the form of resolved micro jump clock error estimates, is used to reset the Kalman filter states holding estimates of GNSS receiver clock frequency and time ("clock phase") error. Normal UTC signal tracking then resumes after applying corrections to the Kalman filter clock error states.

Figure 3:
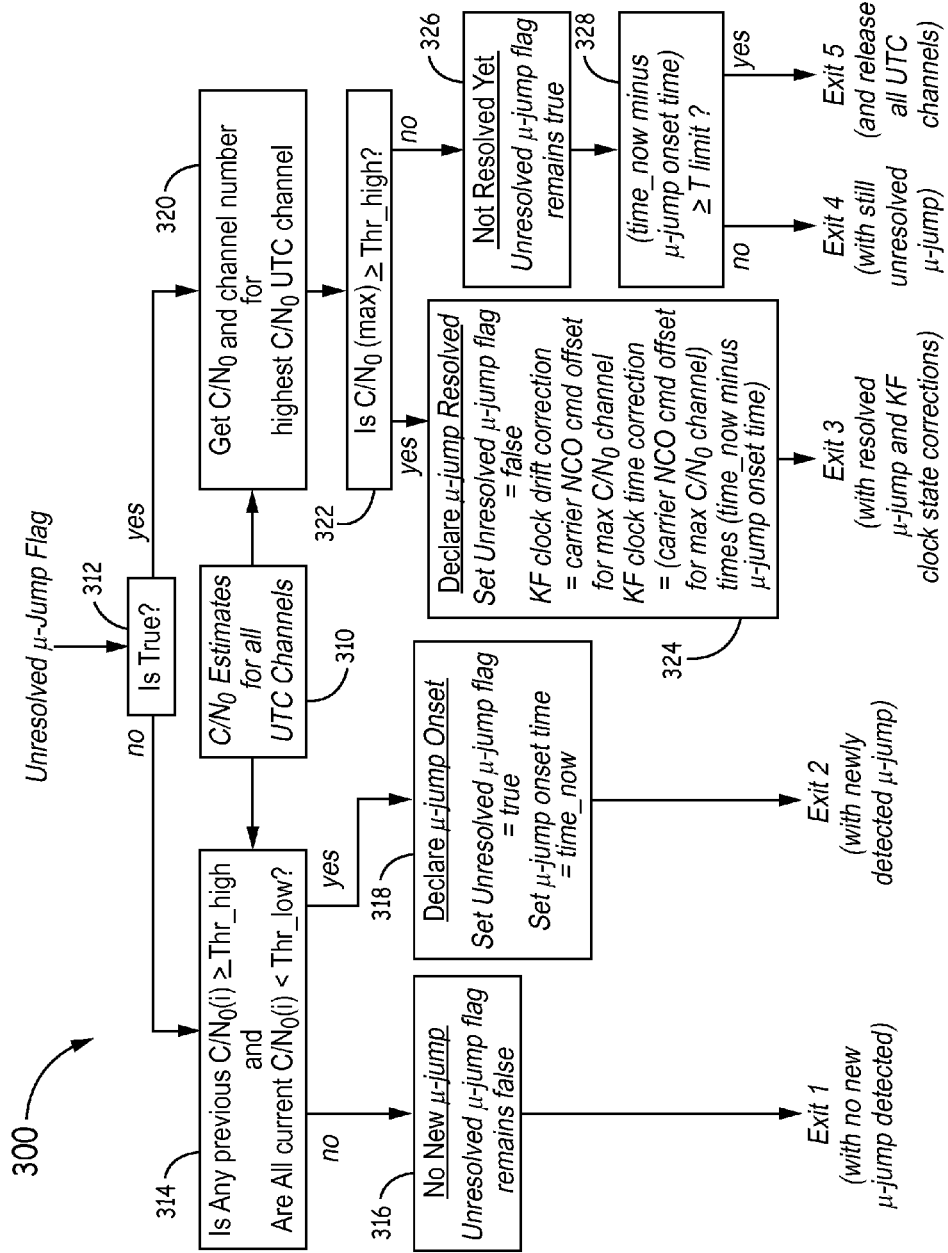
FIG. 3 is a process flow diagram for a detection algorithm that implements the micro jump detection and correction functions used by the navigation and signal tracking loop of FIG. 2.
Figure 4:
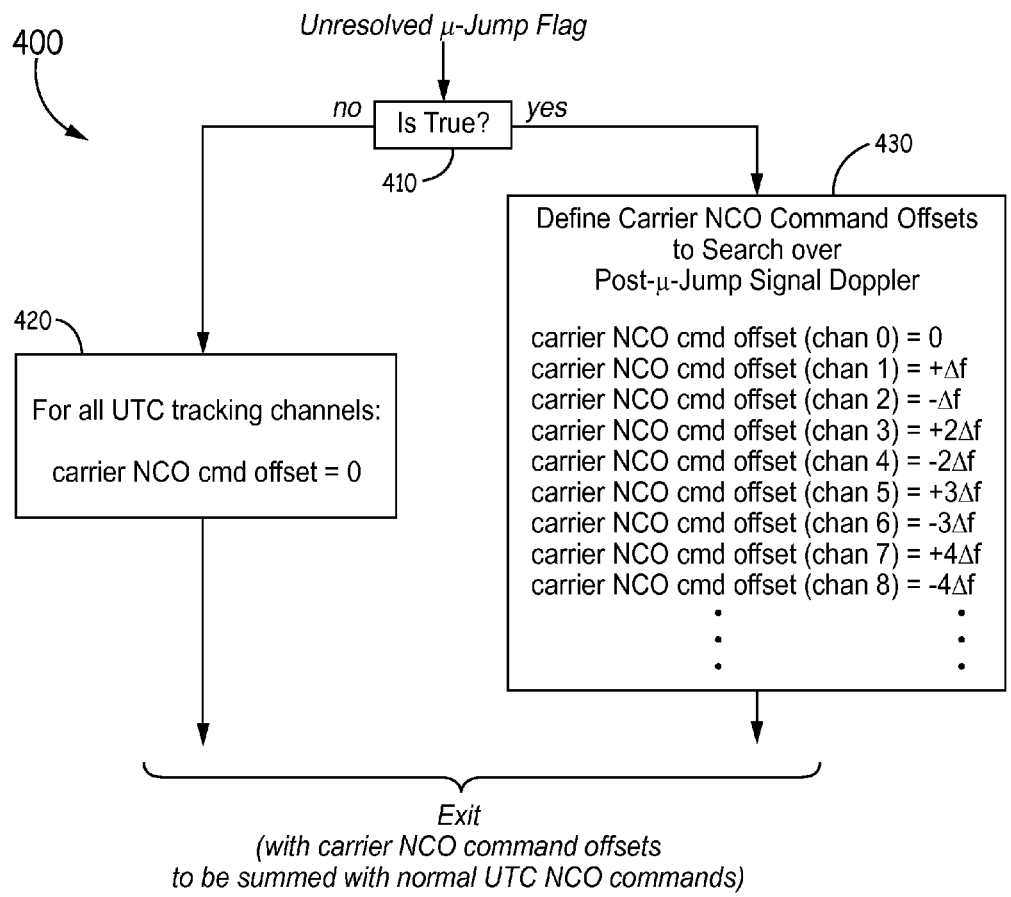
FIG. 4 is a process flow diagram for a search algorithm that implements the function of searching for micro jump frequency shifts after a micro jump is detected by the detection algorithm of FIG. 3.

Further details of the micro jump detection and correction module 140 are described hereafter with reference to FIGS. 3 and 4.

FIG. 3 depicts a micro jump onset and resolution detection method 300 performed by micro jump detector 230. Upon the start of UTC tracking, the unresolved micro jump (UMJ) flag is set to false. From that point on, the behavior of the $C/N_0$ estimate values for all UTC tracking channels are monitored (block 310) to either declare that a micro jump has occurred, or that one has been resolved.

The detection method 300 starts when the UMJ flag is set to either true (yes) or false (no) (block 312). Given the UMJ flag input value and the $C/N_0$ estimate values for all of the UTC tracking channels, there are five possible exit paths from this detection function.

The first exit path corresponds to entering the function with the UMJ flag set at false. A determination is made whether any previous $C/N_0(i)$ estimate is greater than or equal to an upper threshold (Thr_high) and whether all current $C/N_0(i)$ estimates are less than a lower threshold (Thr_low)(block 314). If these conditions are not met, no new micro jump has occurred, and the UMJ flag remains false (block 316). This outcome leads to Exit 1 (with no new μ-jump detected), which is the normal UTC signal tracking condition.

The second exit path of detection method 300 also corresponds to entry with the UMJ flag set at false, but seeing evidence that a micro jump has occurred (e.g., in a large change in the $C/N_0$ values for all UTC tracking channels, between the current time and the immediately preceding time). Thus, if a determination is made that any previous $C/N_0$ estimate is greater than or equal to the upper threshold and that all current $C/N_0$ estimates are less than a lower threshold (block 314), a micro jump onset is declared (block 318). At this point, the UMJ flag is set true, and the onset time of the apparent micro jump is saved (time_now) for later use. This outcome leads to Exit 2 (with newly detected μ-jump), where the UMJ flag is sent to the NCO command offsets module 240, which is described further with reference to FIG. 4.

All of the remaining exit paths through detection method 300 are based on entry to this function with the UMJ flag already set in a true condition, meaning that a micro jump was previously detected, but has not yet been resolved (that is, the frequency offset has not yet been learned).

The third exit path is the path where a micro jump is declared resolved, leading to Exit 3. This happens when one of the UTC tracking channels, which is assigned a particular carrier frequency offset, indicates (via high $C/N_0$) that the associated satellite signal has been detected. This reveals the approximate frequency change that happened at the micro jump event. It is noted that this same frequency change will have affected all of the satellite signal tracking channels.

For example, when detection method 300 gets the $C/N_0$ and channel number for the highest $C/N_0$ UTC channel (block 320), a determination is made whether the highest $C/N_0$ estimate ($C/N_0(max)$) is greater than or equal to the upper threshold (block 322). If yes, the method declares the micro jump event resolved and the UMJ flag is set false (block 324). At this point, the UTC tracking loop will apply a step change/correction to the Kalman filter (KF) value of the clock frequency (drift) error (KF clock drift correction equal to carrier NCO command offset for max $C/N_0$ channel). There will also be a corresponding adjustment to the KF clock phase (time) error state, which is equal to the clock frequency error (carrier NCO command offset for the max $C/N_0$ channel) times the duration of the unresolved micro jump (time_now minus μ-jump onset time), which is the duration time interval between the previously saved micro jump onset time and the time of micro jump resolution. This leads to Exit 3, with the resolved μ-jump and KF clock state corrections being applied to the signal tracking loop.

The fourth exit path is the path where the detection function is entered with an unresolved micro-jump, and there is still no evidence of signal correlation on any of the UTC tracking channels. For example, after detection method 300 gets the $C/N_0$ and channel number for the highest $C/N_0$ UTC channel (block 320), and a determination is made that the highest $C/N_0$ ratio estimate is not greater than or equal to the upper threshold (block 322), the micro jump is not resolved yet and the UMJ flag remains true (block 326). If a pre-defined maximum allowable time (T limit) for the duration of the unresolved micro jump state (time_now minus μ-jump onset time) has not been reached or exceeded (block 328), this leads to Exit 4 (with still unresolved μ-jump), and detection method 300 continues to run.

The fifth exit path of detection method 300 is the path where the detection function is entered with an unresolved micro-jump, there is still no evidence of signal correlation on any of the UTC tracking channels, and the maximum allowable time for the unresolved micro jump state has been reached or exceeded (block 328). In this case, detection method 300 releases all tracking channels from UTC control at Exit 5. The GNSS receiver will then initiate its normal signal reacquisition search, searching more widely over both carrier frequency and code delay in an attempt to recover satellite signal correlation.

FIG. 4 depicts a search method 400 that implements the function of searching for micro jump frequency shifts after a micro jump is detected by detection method 300. The search method 400 is performed by the NCO command offsets module 240 (FIG. 2), which supports the search for the micro jump frequency offset when a micro jump has been detected by micro jump detector 230 (FIG. 2). Under normal conditions, the GNSS oscillator exhibits relatively stable frequency, and the UMJ flag will have a value of false (block 410). In this scenario, the carrier NCO command offsets are set to zero for all UTC tracking channels (block 420) and sent to the exit of search method 400 to be summed with the normal UTC NCO commands. This results in no effect on the normal UTC carrier NCO commands.

Whenever the UMJ flag is set true (block 410), it is assumed that an as yet unknown shift in GNSS oscillator frequency has occurred, and there is a need to search over carrier Doppler looking for evidence of the satellite signals. All of the UTC tracking channels are used in the search process, with each channel being assigned a unique integer multiple of a "delta frequency" (Δf) value (block 430). The symbol Δf represents a "frequency quanta" and the offset for each channel is a unique integer multiple of Δf. The delta frequency defines a carrier NCO command offset (N times Δf, where N is a unique small integer value) for each UTC channel, which is summed into the normal UTC carrier NCO command for each particular tracking channel after exiting method 400.

In an exemplary embodiment, the basic unit of frequency shift assigned to the individual UTC tracking channels during the search process typically has a value in the range of about 50 Hz (for GPS signals). Channels are assigned unique integer multiples of that basic frequency offset quanta: for example, + or −50 Hz (Δf), + or −100 Hz (2Δf), + or −150 Hz (3Δf), etc. The range of potential frequency shifts that can be successfully addressed is (in part) dependent on the number of available UTC tracking channels; the more channels that are available, the wider is the range of micro jump frequency shifts that the present method can successfully address.

When the approximate value of the frequency shift has been learned, corrective actions can be taken to adjust the UTC tracking function's knowledge of the clock frequency error and clock phase error held in the Kalman filter state vector, as described previously with respect to method 300 (FIG. 3). Normal signal tracking then resumes after applying corrections to the Kalman filter. Because GNSS receiver clock errors have a similar effect on all tracking channels, the clock error state corrections applied in response to the micro jump have an identical effect on the replica signal for all channels.

The processor used in the present system and method can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present method and system.

The present methods can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer- or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include conventional hard disks, compact disks, DVDs, Blu-ray discs, or other optical storage disks; volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

Example Implementation

Although the following example is directed to using GPS, and specifically the GPS L2 frequency, the techniques described for this example are equally applicable to other GNSS and other carrier frequencies. In this example, it is assumed that a UTC tracking channel in a GNSS receiver is operating on the GPS L2 link (1227.6 MHz). It is also assumed that there is no significant change in the Doppler effects from one 50 Hz iteration to the next. In the GNSS receiver, a practical implementation would have a least significant bit (LSB) weighting in the carrier NCO command that is in 2's complement format. This format and LSB weighting will vary from one receiver design to another, hence this example will be presented in terms of frequency shift in Hz.

This example also assumes that eleven (11) channels of satellite space vehicles (SVs) are being tracked in the UTC mode, with all 11 channels on the GPS L2 link. This assumption does not prevent the present method from being applicable to a mix of GPS L1 and L2 links being tracked, but rather simplifies the example.

Typically, the autocorrelation amplitude spread is about ±50 Hz from the center frequency. Again assuming a GPS L2 link in this example, the center frequency is 1227.6 MHz, adjusted for Doppler effects both from SV orbits relative to projectile and projectile motion throughout its flight trajectory. An oscillator micro-jump, of say 50 Hz about its maximum correlation center point, will result in zero correlation (i.e., uncorrelated) of the incoming satellite signal and the replica signal for the particular carrier channel being tracked. Hence, the step size to increment or decrement each carrier channel NCO commands would generally be 50 Hz.

The channel with the highest $C/N_0$ ratio remains the base channel in the unlikely event a return to the previous oscillator frequency value occurs, or more likely, a pulse jammer event caused the sudden decrease in $C/N_0$ in an attempt to mimic an oscillator micro-jump.

Since the magnitude of a crystal oscillator micro jump event is more likely to be within ±50 Hz than the next increment of ±100 Hz, the next two highest $C/N_0$ power spectral density channels will be assigned the ±50 Hz increments. The subsequent $C/N_0$ power levels will be assigned the ±100 Hz increments, and so forth, until a spread of ±250 Hz is achieved as a function of the channel's carrier to noise ratio. In essence, an immediate search for best carrier autocorrelation is established trying to discern the new oscillator frequency caused by the micro jump event.

During the carrier autocorrelation search period, the code NCO commands will remain constant, knowing that the code autocorrelation with start to drift off to its center point within the 1 chip (1/10.23 MHz) correlation window. For example, a 50 Hz micro jump event will result in an approximate 10 m/s code track drift. The range of chip for L1 is 29.3 meters, and hence in approximately 3 seconds the cross correlation between the incoming code signal and the replica code would have a zero (or near zero) value. That is to say, both carrier and code correlation would be lost and the UTC likely reaction would be to release all channels and let the GNSS receiver attempt to reacquire code and carrier acquisition.

After a dwell time between a few 50 Hz iterations to a maximum period such that code correlation has not degraded to say less than 50% (preset value) of its optimal correlation prior to the micro jump event, the micro jump is declared resolved. Note that the larger the micro jump value is, the less time it will take to reach the 50% code correlation preset value.

Table 1 lists the channels for the respective space vehicles being tracked in the UTC mode in this example, along with the respective $C/N_0$ levels, the carrier NCO values prior to the micro-jump, and the carrier NCO search parameters. Depending upon the GNSS receiver used, the carrier NCO can be expressed in a nominal frequency of 10.23 MHz or in the carrier's frequency as received by the GNSS receiver, which for the GPS L2 link is 1227.6 MHz (=120*10.23 MHz), The GPS L2 link center frequency of 1227.6 MHz is adjusted for Doppler effects both from SV orbits relative to a projectile and the projectile motion throughout its flight trajectory to maintain carrier tracking. Hypothetical Doppler frequencies are represented in the Carrier NCO Prior to Micro jump column in Table 1.

TABLE 1

| Row | Channel | SV | $C/N_0$ Level | Carrier NCO Prior to Micro-jump | Carrier NCO Search |
|---|---|---|---|---|---|
| 1 | 5 | 21 | 38 db-Hz | 1227.5995 MHz | 1227.5995 MHz + 250 Hz |
| 2 | 4 | 12 | 39 db-Hz | 1227.6002 MHz | 1227.6002 MHz + 200 Hz |
| 3 | 2 | 17 | 40 db-Hz | 1227.6005 MHz | 1227.6005 MHz + 150 Hz |
| 4 | 7 | 19 | 41 dB-Hz | 1227.6001 MHz | 1227.6001 MHz + 100 Hz |
| 5 | 3 | 5 | 42 dB-Hz | 1227.6010 MHz | 1227.6010 MHz + 50 Hz |
| 6 | 6 | 16 | 44 dB-Hz | 1227.5999 MHz | 1227.5999 MHz ± 0 Hz |
| 7 | 11 | 18 | 42 dB-Hz | 1227.6008 MHz | 1227.6008 MHz − 50 Hz |
| 8 | 10 | 23 | 41 dB-Hz | 1227.5997 MHz | 1227.5997 MHz − 100 Hz |
| 9 | 9 | 8 | 40 db-Hz | 1227.5992 MHz | 1227.5992 MHz − 150 Hz |
| 10 | 1 | 28 | 39 db-Hz | 1227.6003 MHz | 1227.6003 MHz − 200 Hz |
| 11 | 8 | 27 | 38 db-Hz | 1227.6011 MHz | 1227.6011 MHz − 250 Hz |

In Table 1, row 6 has the highest $C/N_0$ value (44 dB-Hz), and hence no NCO carrier adjustments are made to this channel. Rows 5 and 7 have the next two highest $C/N_0$ values, and the NCO commands are incremented and decremented by ±50 Hz in the corresponding channels. The next highest $C/N_0$ values are in rows 4 and 8, and the NCO commands are incremented and decremented by ±100 Hz. As shown in Table 1, this pattern continues until rows 1 and 11 are reached, where the NCO commands are incremented and decremented at a maximum of ±250 Hz.

Assuming a micro jump was +75 Hz, the baseline channel would be near zero, and all other channels within the search logic would be near zero as well with the exception of row 5 (channel 3) and row 4 (channel 7). Channel 3 would be shifted up by +50 Hz and given its autocorrelation spread of ±50 Hz, would be able to detect correlation between the ranges of 0 Hz and +100 Hz. Channel 7 would be shifted up by +100 Hz and given its autocorrelation spread of ±50 Hz, would be able to detect correlation between the ranges of +50 Hz and +150 Hz. Both channels 3 and 7 would show a nearly equal correlation of reasonably high correlation amplitude, meaning the frequency jump was near the midpoint between these two channels. Once the NCO shift has been identified, which in this case is approximately +75 Hz, all channels would then be adjusted by +75 Hz from their original carrier NCO commands prior to the micro jump event. All carrier loops should then quickly re-acquire with minimum duration and minimum perturbation to an integrated INS/GNSS Kalman filter.

Finally, during the carrier search period, the code replica would have drifted off of the satellite signal code due to the GNSS oscillator frequency shift and a re-centering operation is implemented for each code tracking channel. Recall that 50 Hz equates to approximately 10 m/sec code delay drift and that the code autocorrelation function is non-zero for ±1 chip of code delay error (or ±29 m for GPS P(Y) code modulation). Assume the carrier search period lasted for 0.3 seconds. If the carrier NCO command had not been adjusted during the search period, then given a 75 Hz micro jump event and the 0.3 second assumed search period, the code tracking loops would have drifted off by −0.15 chips (−75 Hz*(10 m/s/50 Hz)=−15 m/sec, then 0.3 seconds=−4.5 m, −4.5 m/29.3 m/chip=−0.15 chips). However, the code NCO command adjustment must also account for errors caused by the carrier search bins.

For example, in row 7 (channel 11) of Table 1, the carrier frequency error during the search period is the 75 Hz micro jump offset assumed in this example, plus the −50 Hz assigned to this channel during the search period. Hence, the channel 11 frequency error is −75 Hz plus the −50 Hz, or −125 Hz during the full 0.3 second search period. The code correlation chip error for channel 11 therefore would be −0.256 chips (−125 Hz*(10 m/s/50 Hz)=−25 m/sec, then 0.3 seconds=−7.5 m, −7.5 m/29.3 m/chip=−0.256 chips).

The larger the frequency error that occurs during a micro-jump, the more quickly the code correlation will be lost. The magnitude and sign of a given micro-jump plus the most distant frequency bin from the new oscillator frequency will represent the worst case frequency error for any channel. The search algorithm, and dwell period duration, must take into account anticipated maximum frequency error such that loss in code tracking loop lock is either averted or at least minimized for all channels previously tracked.

Example Embodiments

Example 1 includes a navigation system comprising a GNSS receiver configured to receive multiple GNSS signals on a plurality of signal tracking channels, an INS configured to generate inertial data, and a processor in operative communication with the GNSS receiver and the INS. A micro jump detection and correction module is in operative communication with the processor and comprises an oscillator micro jump detector configured to monitor estimates of $C/N_0$ ratios in all of the signal tracking channels, and detect onset of a micro jump event when there is an abrupt decrease in the $C/N_0$ ratios in all of the signal tracking channels. A carrier NCO command offsets module is in operative communication with the micro jump detector and is configured to define a plurality of carrier NCO command offsets to search over signal Dopplers in all available signal tracking channels after the micro-jump event is detected, and send the carrier NCO command offsets to the GNSS receiver to be added to nominal carrier NCO commands. The micro jump detector is further configured to select a signal tracking channel with the highest $C/N_0$ ratio after the carrier NCO command offsets are added to the nominal carrier NCO commands, compute corrections for clock error estimates, and send the corrections for the clock error estimates to a GNSS/inertial Kalman filter.

Example 2 includes the navigation system of Example 1, wherein the GNSS receiver, the INS, and the processor are configured in a UTC navigation and signal tracking loop.

Example 3 includes the navigation system of any of Examples 1-2, wherein the GNSS receiver comprises a correlators module configured to receive downconverted and sampled GNSS signals, and a code and carrier replica generator configured to output satellite signal replicas to the correlators module. The correlators module compares each generated signal replica with a respective downconverted signal, and based on the comparison, outputs I and Q data for multiple signal tracking channels and multiple code delay taps per channel.

Example 4 includes the navigation system of Example 3, wherein the I and Q data is supplied to the Kalman filter and a $C/N_0$ estimator.

Example 5 includes the navigation system of Example 4, wherein the Kalman filter sends clock error estimates to an NCO command generator, and sends navigation reset data to the INS.

Example 6 includes the navigation system of Example 5, wherein the $C/N_0$ estimator outputs the $C/N_0$ ratios for all of the signal tracking channels to the micro-jump detector and to the Kalman filter.

Example 7 includes the navigation system of any of Examples 5-6, wherein the NCO command generator computes NCO commands based on the clock error estimates from the Kalman filter and an inertial navigation solution generated by the INS.

Example 8 includes the navigation system of any of Examples 2-7, wherein the carrier NCO command offsets are each assigned to respective UTC tracking channels, with each of the carrier NCO command offsets being a unique integer multiple of a common frequency offset quanta.

Example 9 includes the navigation system of any of Examples 4-8, wherein the corrections for the clock error estimates comprise corrections for clock frequency and clock phase errors in a state vector of the Kalman filter.

Example 10 includes a method for micro jump detection and resolution, the method comprising: monitoring estimates of $C/N_0$ ratios in a plurality of signal tracking channels in a GNSS receiver that is integrated with an INS; determining whether any previous $C/N_0$ ratio is greater than or equal to an upper threshold and whether all current $C/N_0$ ratios are less than a lower threshold; detecting onset of an oscillator micro jump event in the GNSS receiver when any previous $C/N_0$ ratio is greater than or equal to the upper threshold and all current $C/N_0$ ratios are less than a lower threshold; assigning all available signal tracking channels different frequency command offsets to search over signal Dopplers in all available signal tracking channels after the micro jump event is detected; adding the frequency command offsets with nominal carrier commands in the GNSS receiver; selecting a signal tracking channel with the highest $C/N_0$ ratio after the frequency command offsets are added to the nominal carrier commands; determining whether the highest $C/N_0$ ratio is greater than or equal to the upper threshold; declaring the micro jump event resolved when the highest $C/N_0$ ratio is greater than or equal to the upper threshold; computing corrections for clock error estimates after resolution of the micro jump event; and sending the corrections for the clock error estimates to a GNSS/inertial Kalman filter.

Example 11 includes the method of Example 10, wherein the GNSS receiver and the INS are configured in a UTC navigation and signal tracking loop.

Example 12 includes the method of any of Examples 10-11, wherein after the micro jump event is detected, an unresolved micro jump flag is set to true, and an onset time of the micro jump event is saved.

Example 13 includes the method of any of Examples 11-12, wherein the frequency command offsets are each assigned to respective UTC tracking channels, with each of the frequency command offsets being a unique integer multiple of a frequency offset quanta.

Example 14 includes the method of any of Examples 12-13, wherein after resolution of the micro jump event, the unresolved micro jump flag is set to false.

Example 15 includes the method of any of Examples 10-14, wherein the corrections for the clock error estimates comprise corrections for clock frequency and clock phase errors in a state vector of the Kalman filter.

Example 16 includes the method of any of Examples 12-15, wherein if the highest $C/N_0$ ratio is not greater than or equal to the upper threshold, the unresolved micro jump flag remains set as true, and a determination is made whether a pre-defined maximum time limit for the duration of the unresolved micro jump has been reached or exceeded.

Example 17 includes the method of Example 16, wherein if the maximum time limit for the duration of the unresolved micro jump has been reached or exceeded, all of the signal tracking channels are released from UTC control.

Example 18 includes a non-transitory computer readable medium including instructions executable by a processor to perform a method for micro jump detection and resolution, the method comprising: monitoring estimates of $C/N_0$ ratios in a plurality of signal tracking channels in a GNSS receiver that is integrated with an INS; detecting onset of an oscillator micro jump event in the GNSS receiver when any previous $C/N_0$ ratio is greater than or equal to an upper threshold and all current $C/N_0$ ratios are less than a lower threshold; assigning all available signal tracking channels different frequency command offsets to search over signal Dopplers in all available signal tracking channels after the micro jump event is detected; adding the frequency command offsets with nominal carrier commands in the GNSS receiver; selecting a signal tracking channel with the highest $C/N_0$ ratio after the frequency command offsets are added to the nominal carrier commands; declaring the micro-jump event resolved when the highest $C/N_0$ ratio is greater than or equal to the upper threshold; computing corrections for clock error estimates after resolution of the micro jump event; and sending the corrections for the clock error estimates to a GNSS/inertial Kalman filter.

Example 19 includes the non-transitory computer readable medium of Example 19, wherein the GNSS receiver and the INS are configured in a UTC navigation and signal tracking loop.

Example 20 includes the non-transitory computer readable medium of Example 19, wherein the frequency command offsets are each assigned to respective UTC tracking channels, with each of the frequency command offsets being a unique integer multiple of a frequency offset quanta.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A navigation system, comprising:
   a global navigation satellite system (GNSS) receiver configured to receive multiple GNSS signals on a plurality of signal tracking channels;
   an inertial navigation system (INS) configured to generate inertial data;
   a processor in operative communication with the GNSS receiver and the INS; and
   a micro jump detection and correction module in operative communication with the processor and comprising:
   an oscillator micro jump detector configured to:
      monitor estimates of carrier to noise density ($C/N_0$) ratios in all of the signal tracking channels; and
      detect onset of a micro jump event when there is an abrupt decrease in the $C/N_0$ ratios in all of the signal tracking channels;
   a carrier numerically controlled oscillator (NCO) command offsets module in operative communication with the micro jump detector and configured to:
      define a plurality of carrier NCO command offsets to search over signal Dopplers in all available signal tracking channels after the micro jump event is detected; and
      send the carrier NCO command offsets to the GNSS receiver to be added to nominal carrier NCO commands;
   wherein the micro jump detector is further configured to:
      select a signal tracking channel with the highest $C/N_0$ ratio after the carrier NCO command offsets are added to the nominal carrier NCO commands;
      compute corrections for clock error estimates; and
      send the corrections for the clock error estimates to a GNSS/inertial Kalman filter.

2. The navigation system of claim 1, wherein the GNSS receiver, the INS, and the processor are configured in an ultra-tightly-coupled (UTC) navigation and signal tracking loop.

3. The navigation system of claim 2, wherein the GNSS receiver comprises:
   a correlators module configured to receive downconverted and sampled GNSS signals; and
   a code and carrier replica generator configured to output satellite signal replicas to the correlators module;
   wherein the correlators module compares each generated signal replica with a respective downconverted signal, and based on the comparison, outputs inphase (I) and quadrature phase (Q) data for multiple signal tracking channels and multiple code delay taps per channel.

4. The navigation system of claim 3, wherein the I and Q data is supplied to the Kalman filter and a $C/N_0$ estimator.

5. The navigation system of claim 4, wherein the Kalman filter sends clock error estimates to an NCO command generator, and sends navigation reset data to the INS.

6. The navigation system of claim 5, wherein the $C/N_0$ estimator outputs the $C/N_0$ ratios for all of the signal tracking channels to the micro jump detector and to the Kalman filter.

7. The navigation system of claim 6, wherein the NCO command generator computes NCO commands based on the clock error estimates from the Kalman filter and an inertial navigation solution generated by the INS.

8. The navigation system of claim 6, wherein the carrier NCO command offsets are each assigned to respective UTC tracking channels, with each of the carrier NCO command offsets being a unique integer multiple of a common frequency offset quanta.

9. The navigation system of claim 6, wherein the corrections for the clock error estimates comprise corrections for clock frequency and clock phase errors in a state vector of the Kalman filter.

10. A method for micro jump detection and resolution, the method comprising:
   monitoring estimates of carrier to noise density ($C/N_0$) ratios in a plurality of signal tracking channels in a global navigation satellite system (GNSS) receiver that is integrated with an inertial navigation system (INS);
   determining whether any previous $C/N_0$ ratio is greater than or equal to an upper threshold and whether all current $C/N_0$ ratios are less than a lower threshold;
   detecting onset of an oscillator micro jump event in the GNSS receiver when any previous $C/N_0$ ratio is greater than or equal to the upper threshold and all current $C/N_0$ ratios are less than a lower threshold;
   assigning all available signal tracking channels different frequency command offsets to search over signal Dopplers in all available signal tracking channels after the micro jump event is detected;

adding the frequency command offsets with nominal carrier commands in the GNSS receiver;

selecting a signal tracking channel with the highest $C/N_0$ ratio after the frequency command offsets are added to the nominal carrier commands;

determining whether the highest $C/N_0$ ratio is greater than or equal to the upper threshold;

declaring the micro-jump event resolved when the highest $C/N_0$ ratio is greater than or equal to the upper threshold;

computing corrections for clock error estimates after resolution of the micro-jump event; and sending the corrections for the clock error estimates to a GNSS/inertial Kalman filter.

11. The method of claim 10, wherein the GNSS receiver and the INS are configured in an ultra-tightly-coupled (UTC) navigation and signal tracking loop.

12. The method of claim 11, wherein after the micro jump event is detected, an unresolved micro jump flag is set to true, and an onset time of the micro-jump event is saved.

13. The method of claim 12, wherein the frequency command offsets are each assigned to respective UTC tracking channels, with each of the frequency command offsets being a unique integer multiple of a frequency offset quanta.

14. The method of claim 13, wherein if the highest $C/N_0$ ratio is not greater than or equal to the upper threshold, the unresolved micro jump flag remains set as true, and a determination is made whether a pre-defined maximum time limit for the duration of the unresolved micro jump has been reached or exceeded.

15. The method of claim 14, wherein if the maximum time limit for the duration of the unresolved micro jump has been reached or exceeded, all of the signal tracking channels are released from UTC control.

16. The method of claim 12, wherein after resolution of the micro jump event, the unresolved micro jump flag is set to false.

17. The method of claim 16, wherein the corrections for the clock error estimates comprise corrections for clock frequency and clock phase errors in a state vector of the Kalman filter.

18. A non-transitory computer readable medium including instructions executable by a processor to perform a method for micro jump detection and resolution, the method comprising:

monitoring estimates of carrier to noise density ($C/N_0$) ratios in a plurality of signal tracking channels in a global navigation satellite system (GNSS) receiver that is integrated with an inertial navigation system (INS);

detecting onset of an oscillator micro jump event in the GNSS receiver when any previous $C/N_0$ ratio is greater than or equal to an upper threshold and all current $C/N_0$ ratios are less than a lower threshold;

assigning all available signal tracking channels different frequency command offsets to search over signal Dopplers in all available signal tracking channels after the micro jump event is detected;

adding the frequency command offsets with nominal carrier commands in the GNSS receiver;

selecting a signal tracking channel with the highest $C/N_0$ ratio after the frequency command offsets are added to the nominal carrier commands;

declaring the micro-jump event resolved when the highest $C/N_0$ ratio is greater than or equal to the upper threshold;

computing corrections for clock error estimates after resolution of the micro-jump event; and sending the corrections for the clock error estimates to a GNSS/inertial Kalman filter.

19. The non-transitory computer readable medium of claim 18, wherein the GNSS receiver and the INS are configured in an ultra-tightly-coupled (UTC) navigation and signal tracking loop.

20. The non-transitory computer readable medium of claim 19, wherein the frequency command offsets are each assigned to respective UTC tracking channels, with each of the frequency command offsets being a unique integer multiple of a frequency offset quanta.

* * * * *